United States Patent
Goto (10) Patent No.: US 7,045,371 B2
(45) Date of Patent: May 16, 2006

(54) FOREIGN MATERIAL REMOVING METHOD FOR CAPACITANCE TYPE DYNAMIC QUANTITY SENSOR

(75) Inventor: Keisuke Goto, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/916,469

(22) Filed: Aug. 12, 2004

(65) Prior Publication Data

US 2005/0059239 A1    Mar. 17, 2005

(30) Foreign Application Priority Data

Sep. 12, 2003  (JP) .............................. 2003-321906

(51) Int. Cl.
  *H01L 31/26* (2006.01)
  *H01L 21/66* (2006.01)

(52) U.S. Cl. .............................. 438/16; 438/48; 438/97

(58) Field of Classification Search ................... 438/16, 438/48, 50, 97, 712

See application file for complete search history.

(56) References Cited

U.S. PATENT DOCUMENTS

| | | | |
|---|---|---|---|
| 4,934,200 A * | 6/1990 | Lantz | 73/863.85 |
| 5,228,341 A | 7/1993 | Tsuchitani et al. | |
| 6,538,798 B1 * | 3/2003 | Miller et al. | 359/291 |
| 2002/0140533 A1 * | 10/2002 | Miyazaki et al. | 335/78 |

FOREIGN PATENT DOCUMENTS

| | | |
|---|---|---|
| JP | A-8-136377 | 5/1996 |
| JP | A-2000-46863 | 2/2000 |

* cited by examiner

Primary Examiner—Phuc T. Dang
(74) Attorney, Agent, or Firm—Posz Law Group, PLC

(57) ABSTRACT

In a capacitance type acceleration sensor comprising a movable portion which is equipped with movable electrodes, a poise portion and spring portions formed on a semiconductor substrate and is displaced under application of acceleration, and fixed portions each of which is equipped with fixed electrodes having detection faces confronting the detection faces of the movable electrodes, the movable portion is forcedly displaced by applying a predetermined driving voltage between the movable portion and each of the fixed portions, whereby foreign material hidden in a hollow portion between the movable portion and the semiconductor substrate below the movable portion is exposed and removed by a suction unit.

13 Claims, 4 Drawing Sheets

FOREIGN MATERIAL REMOVING METHOD FOR CAPACITANCE TYPE DYNAMIC QUANTITY SENSOR

CROSS REFERENCE TO RELATED APPLICATION

This application is based upon, claims the benefit of priority of, and incorporates by reference the contents of, Japanese Patent Application No. 2003-321906 filed on Sep. 12, 2003.

FIELD OF THE INVENTION

The present invention relates generally to a method for removing foreign material from a capacitance type dynamic quantity sensor that detects a dynamic quantity such as an acceleration, angular velocity or the like.

BACKGROUND OF THE INVENTION

The structure of a conventional capacitance type dynamic quantity sensor formed on a semiconductor substrate has recently been designed to be higher in density and more complicated to satisfy the requirements of high precision and high sensitivity. Therefore, it is very difficult to perform visual examination at each of the sites corresponding to the constituent elements of the sensor.

Also, the capacitance type dynamic quantity sensor as described above has problems in quality resulting from adherence of foreign material. Particularly, when foreign material becomes invisible in a hollow portion between a movable portion and a semiconductor substrate, the foreign material concerned cannot be detected by visual examination using visible light. Therefore, there is a risk that foreign material is adhered to the sensor in the gap between a movable portion (movable electrode, poise portion) and a fixed electrode and the gap between a movable portion and a semiconductor substrate, to thereby prevent normal operation.

A method of detecting foreign material hidden between a movable portion and a semiconductor substrate has been disclosed in which an infrared ray or the like is transmitted through the movable portion with a detector.

However, even when the foreign material is detected by the detector described above, it is difficult to remove the foreign material hidden between the movable portion and the semiconductor substrate, thus resulting in a defective sensor containing such foreign material.

SUMMARY OF THE INVENTION

The present invention has been implemented in view of the foregoing problem, and has an object to provide a foreign material removing method for a capacitance type dynamic quantity sensor in which foreign material in a hollow portion under a movable portion can be removed.

In order to attain the above object, according to a first aspect of the present invention, a foreign material removing method for a capacitance type dynamic quantity sensor comprising a movable portion having a poise portion which is mounted on a semiconductor substrate through a spring portion and displaced in accordance with application of a dynamic quantity to be detected, and movable electrodes integrally formed with the poise portion so as to extend from the side surface of the poise portion, and a fixed portion having fixed portion anchors mounted on the semiconductor substrate, and fixed electrodes each of which has a detection face confronting to a detection face of each of the movable electrodes and extends from each of the fixed portion anchors, the dynamic quantity being detected on the basis of variation of electrostatic capacitance between each movable electrode and each fixed electrode when under the application of the dynamic quantity, the movable portion is displaced in a direction along which the distance between the detection faces of the movable electrode and the fixed electrode varies, is characterized in that a predetermined driving voltage is applied between the movable portion and the fixed portion and the movable portion is displaced so that foreign material in a hollow portion below the movable portion is exposed to the outside and removed.

As described above, by applying a predetermined driving voltage between the movable portion and the fixed portion, electrostatic force occurs between the movable electrode and the fixed electrode, and thus the movable portion can be displaced in accordance with the electrostatic force. Accordingly, the foreign material hidden in the hollow portion between the movable portion and the semiconductor substrate site under the movable portion is exposed to the outside by the displacement of the movable portion, so that the foreign material can be removed.

According to a second aspect of the present invention, the foreign material thus exposed may be removed under suction while the movable portion is displaced.

In this case, since the foreign material can be forcibly sucked, the foreign material can be removed under suction if even a slight amount of the foreign material is exposed. Furthermore, even when the foreign material is electrified and attached, the foreign material can be removed.

According to a third aspect of the present invention, the foreign material is removed under suction while the movable portion is displaced under the state that the capacitance type dynamic quantity sensor is disposed so that the movable portion is located below the semiconductor substrate, whereby the foreign material can be more efficiently removed.

According to a fourth aspect of the present invention, as another foreign material removing method, the capacitance type dynamic quantity sensor is disposed so that the movable portion is located below the semiconductor substrate, and the movable portion is displaced under this state so that the foreign material exposed is made to fall down, thereby removing the foreign material.

If the foreign material is substantially perfectly exposed, the foreign material falls by its own weight, thereby removing the foreign material.

According to a fifth aspect of the present invention, under the condition of the fourth aspect, when the capacitance type dynamic quantity sensor is mounted in a package, the foreign material can be made to fall and removed by applying external force to the package under the state that the movable portion is displaced.

In this case, even when the foreign material is not perfectly exposed, the foreign material can be perfectly exposed from the movable portion by impact, and made to fall down to be removed.

According to a sixth aspect of the present invention, under the condition of the fourth aspect, a driving voltage is applied in such a way that the movable electrode is successively displaced toward each of both the fixed electrodes which are disposed to sandwich the movable electrode therebetween and confront the movable electrode, thereby displacing the movable portion, so that the foreign material can be made to fall down and removed.

In this case, even when the foreign material is not exposed, the foreign material is waggled by the displacement of the movable portion and thus perfectly exposed from the movable portion, so that the foreign material can be made to fall and removed.

According to a seventh aspect of the present invention, it is preferable that the foreign material in the hollow portion under the movable portion is detected by a detector, and the foreign material is removed on the basis of the detection result. Furthermore, according to an eighth aspect of the present invention, it is preferable that the detector checks whether the detected foreign material has been removed. In this case, the removal of the foreign material and the visual examination can be executed in the same step.

According to a ninth aspect of the present invention, it is preferable that by adopting a detector using visible light as the detector, the detection of the seventh aspect or eighth aspect is carried out under the state that the movable portion is displaced.

A detector using infrared ray or the like is used as the detector, and the infrared ray is transmitted through the movable portion while the movable portion is not displaced, whereby the foreign material can be detected. However, the infrared ray is lower in detection capability as compared with the visible light, it is more difficult to detect minute foreign material in the case of a low-magnification lens, and the detection field of view is narrower in the case of a high-magnification lens, so that a long detection time is needed. Accordingly, by applying the detector using visible light under the state of the movable portion being displaced, the foreign material can be more surely removed.

BRIEF DESCRIPTION OF THE DRAWINGS

The above and other objects, features and advantages of the present invention will become more apparent from the following detailed description made with reference to the accompanying drawings. In the drawings:

FIGS. 1A and 1B are diagrams showing the construction of a sensor portion of a capacitance type acceleration sensor according to a first embodiment of the present invention, wherein

FIGS. 3A to 3C are cross-sectional views showing a method of removing foreign material, wherein

DETAILED DESCRIPTION OF THE PREFERRED EMBODIMENTS

Preferred embodiments according to the present invention will be described hereunder with reference to the accompanying drawings.

In the following embodiments, a capacitance type acceleration sensor is representatively used as a capacitance type dynamic quantity sensor according to the present invention, however, the present invention may be applicable to other sensors than the capacitance type acceleration sensor.

First Embodiment

Figure 1A:
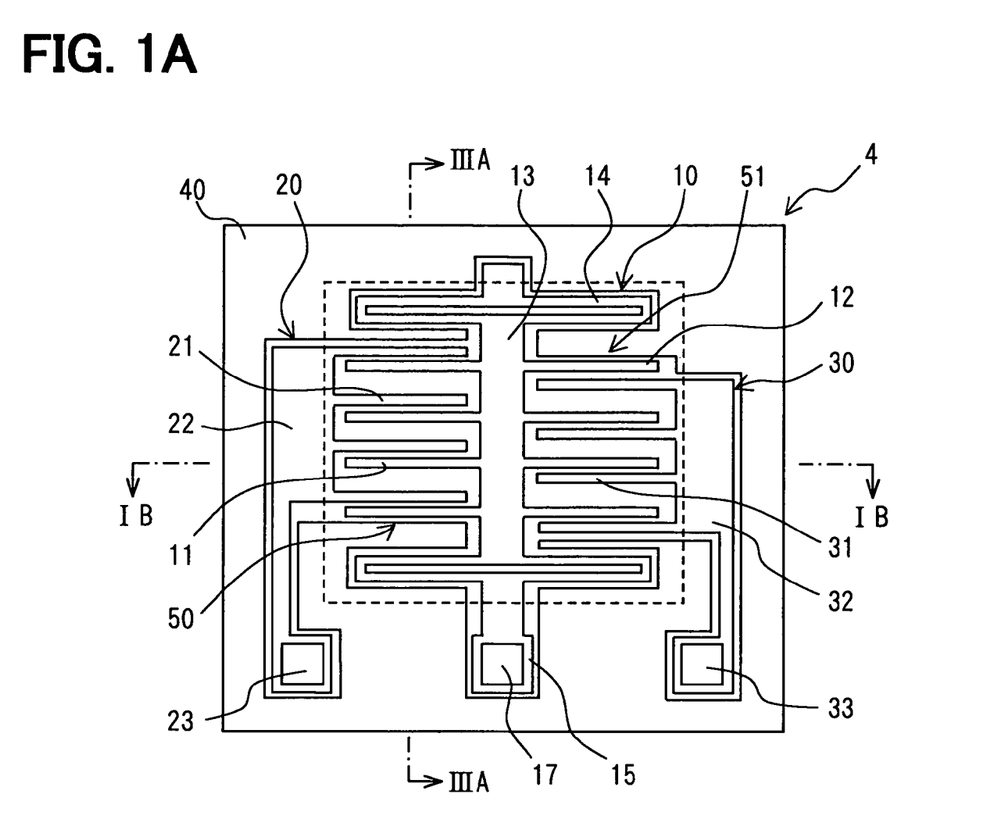
FIG. 1A is a plan view and FIG. 1B is a cross-sectional view taken along a line IA—IA of FIG. 1A.
Figure 1B:
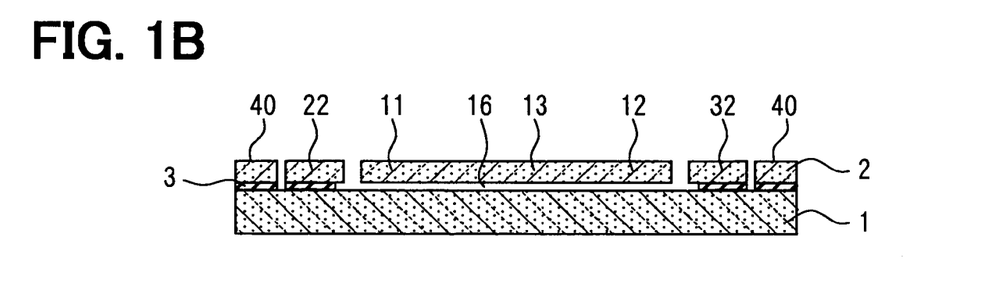

FIGS. 1A and 1B are diagrams showing the construction of a sensor portion of a capacitance type acceleration sensor according to a first embodiment, wherein FIG. 1A is a plan view and FIG. 1B is a cross-sectional view taken along a line IB—IB of FIG. 1A.

As shown in FIG. 1B, the capacitance type acceleration sensor is constructed by forming an insulating layer 3 of silicon oxide as a sacrifice layer between a first semiconductor layer 1 and a second semiconductor layer 2 which are formed of monocrystal silicon, thereby forming an SOI (Silicon On Insulator) substrate, and then forming a sensor portion 4 in the SOI (Silicon On Insulator) substrate by using a well-known micro-machining technique that utilizes a semiconductor manufacturing technique. In this embodiment, the semiconductor substrate refers to the first semiconductor layer 1.

As shown in FIG. 1A, the sensor portion 4 comprises a movable portion 10, a pair of fixed portions 20, 30 and a surrounding portion 40 disposed to surround the movable portion 10 and the fixed portions 20 and 30. These portions 10, 20, 30 and 40 are formed from the second semiconductor layer 2. Predetermined intervals are equipped among the movable portion 10, the fixed portions 20, 30 and the surrounding portions 40, whereby these portions are mutually insulated from one another.

The movable portion 10 comprises movable electrodes 11, 12, a poise portion 13 and spring portions 14.

The movable electrodes 11 and 12 are integrally formed with the poise portion 13 to serve as a mass portion to which acceleration is applied so that they extend from both the side surfaces of the poise portion 13 in a direction perpendicular to the longitudinal direction of the poise portion 13. Every four movable electrodes are equipped to each side surface of the poise portion 13 as shown in FIG. 1A.

The spring portion 14 is formed at each of both ends of the poise portion 13, and it joins the poise portion 13 to a movable portion anchor 15 serving as a support portion which is connected to the first semiconductor layer 1 through the insulating layer 3. Furthermore, in this embodiment, each spring portion 14 is designed in a rectangular shape having a through hole elongated in a direction perpendicular to an acceleration applying direction (vertical direction in FIG. 1A). Accordingly, each spring portion has a spring function, that is, it is displaced along the acceleration applying direction, so that under application of acceleration to the movable portion 10, the poise portion 13 and the movable electrodes 11, 12 are displaced in the opposite direction to the acceleration applying direction, and also they are returned to the original positions when the acceleration is vanished.

At an area where the movable electrodes 11, 12, the poise portion 13 and the spring portions 14 are formed, the second semiconductor layer 2 and the insulating layer 3 are removed by selective etching (an area surrounded by a broken line of FIG. 1A) and thus a hollow portion 16 exists. Furthermore, a movable electrode pad 17 connected to a C-V converting circuit described later is formed at and linked to a predetermined position of the movable portion anchor 15.

The fixed portion 20 (30) comprises fixed electrodes 21 (31) and a fixed portion anchor 22 (32).

The fixed electrodes 21 (31) extend from the fixed portion anchor 22 (32), and are disposed in parallel to the movable electrodes 11 (12) extending from each of both the side surfaces of the poise portion 13 so that the detection faces of each fixed electrode and each movable electrode are spaced from each other at a predetermined interval to confront each other. Furthermore, as in the case of the movable electrodes 11, 12, a hollow portion 16 is formed beneath the fixed electrodes 21 and 31 by selective etching (the area surrounded by the broken line of FIG. 1A), and the fixed electrodes 21 and 31 are cantilevered by the fixed portion anchors 22, 32.

The fixed electrodes 21 and 31 are equipped with adhesion-preventing projecting portions (not shown) at predetermined positions of the detection faces confronting the detection faces of the movable electrodes 11 and 12. Accordingly, adhesion due to sticking between the fixed electrodes 21, 31 and the movable electrodes 11, 12 is prevented.

The fixed portion anchors 22, 32 are disposed in parallel to the poise portion 13, fixed to the first semiconductor layer through the insulating layer 3, and equipped with fixed electrode pads 23, 33 to be connected to the C-V conversion circuit at predetermined positions.

Here, as in the case of the movable electrodes 11, 12, four fixed electrodes 21 (31) are equipped at each side as shown in FIG. 1A. A first detector 50 is constructed by all the respective pairs (four pairs in FIG. 1A) of confronting movable and fixed electrodes 11 and 21, and also a second detector 51 is constructed by all the respective pairs (four pairs in FIG. 1A) of confronting movable and fixed electrodes 12 and 31. In this embodiment, the number of the movable electrodes 11 (12) and the number of the fixed electrodes 31 (32) are respectively set to four at each of the first and second detectors 50 and 51; however, the number of electrodes is not limited to four.

In the capacitance type acceleration sensor thus constructed, when the total electrostatic capacitance of the first detector 50 comprising the movable electrodes 11 and the fixed electrodes 21 is represented by CS1, and the total electrostatic capacitance of the second detector 51 comprising the movable electrodes 12 and the fixed electrodes 31 is represented by CS2, the respective electrodes 11, 21 and 12, 31 are arranged so that the electrostatic capacitance difference $\Delta C$ (=CS1−CS2) under the state that no acceleration is applied is substantially equal to zero. When acceleration in the vertical direction of FIG. 1A (corresponding to the detection direction) is applied to the poise portion 13 serving as the mass portion, the movable portion 10 is displaced in the opposite direction to the acceleration applying direction. Accordingly, the applied acceleration can be detected by detecting the electrostatic capacitance difference $\Delta C$ as a voltage variation in the C-V converting circuit. The acceleration may be detected on the basis of the capacitance variation of any one of the first detector 50 and the second detector 51.

Figure 2:
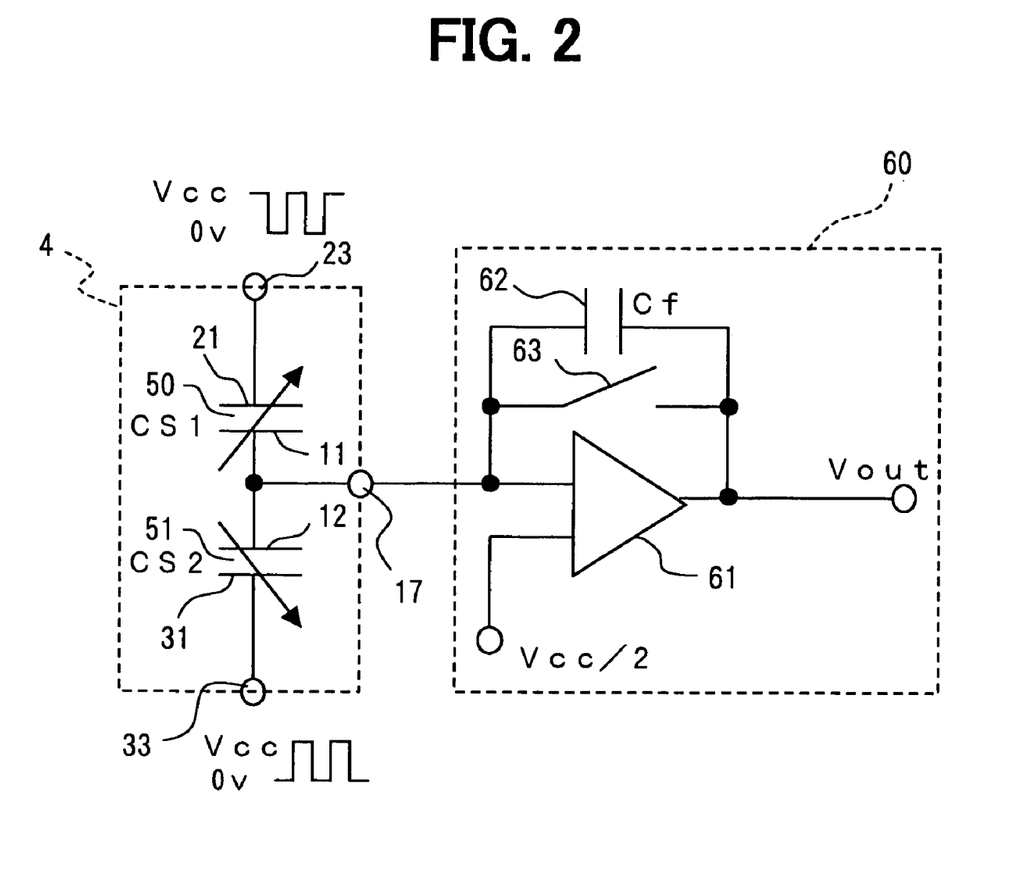
FIG. 2 is a diagram showing an example of a detection circuit of the capacitance type acceleration sensor.

Next, an exemplary detecting circuit for the capacitance type acceleration sensor of this embodiment will be discussed with reference to FIG. 2. A circuit unit of the sensor according to this embodiment has a C-V converting circuit (switched capacitor circuit) 60. The C-V converting circuit converts to a voltage the electrostatic capacitance difference between the electrostatic capacitance CS1 based on the movable electrodes 11 and the fixed electrodes 21 constituting the first detector 50 and the electrostatic capacitance CS2 based on the movable electrodes 12 and the fixed electrodes 31 constituting the second detector 51, and comprises an operational amplifier 61, a capacitor 62 and a switch 63.

An inverted input terminal of the operational amplifier 61 is connected to the movable electrodes 11, 12 through the movable electrode pad 17, and the capacitor 62 and the switch 63 are connected in parallel between the inverted input terminal and the output terminal of the operational amplifier 61. A voltage of Vcc/2 is input from a voltage source (not shown) to a non-inverted input terminal of the operational amplifier 61.

The circuit unit has a control circuit (not shown). The control circuit inputs a first carrier wave periodically-varying with a constant amplitude Vcc from one fixed electrode pad 23 to the fixed electrodes 21 of the first detector 50, and inputs a second carrier wave shifted in phase from the first carrier wave by 180° and having the same amplitude Vcc as that of the first carrier wave, from the other fixed electrode pad 33 to the fixed electrodes 31 of the second detector 51.

Accordingly, when no acceleration is applied, the potential difference of each of the first and second detectors 50 and 51 is equal to Vcc/2, and thus the electrostatic capacitance CS1 of the first detector 50 and the electrostatic capacitance CS2 of the second detector 51 are substantially equal to each other. In the C-V converting circuit 60, the switch 63 is opened/closed with a predetermined period in conformity with the period of the first and second carrier waves, and the acceleration is detected when the switch 63 is opened. At this time, an output voltage Vout from the C-V converting circuit 60 is represented by the following equation.

$$V\text{out} = (CS1 - CS2) \times Vcc/Cf \tag{1}$$

Where Cf represents the electrostatic capacitance of the capacitor 62.

When the acceleration is applied, the balance between the electrostatic capacitance CS1 of the first detector 50 and the electrostatic capacitance CS2 of the second detector 51 is varied, and the voltage Vout corresponding to the electrostatic capacitance difference (CS1−CS2) of the equation (1) is output. The output Vout is subjected to signal processing by an amplifying circuit, a low pass filter, etc. (not shown), and detected as an acceleration detection signal. A voltage of Vcc/2 is input from the voltage source (not shown) to the non-inverted input terminal of the operational amplifier 61. However, the above embodiment may be equipped with a self-diagnosis function in which a voltage V1 different from Vcc/2 is provided and the voltage to be applied to the non-inverted input terminal of the operational amplifier 61 is switched to V1 at the predetermining timing corresponding to the period of the first and second carrier waves by a switch (not shown), thereby forcedly displacing the movable electrodes 11, 12.

For example when the capacitance type acceleration sensor thus constructed is used as a product and foreign material such as crud from the etching process, dust or the like may remain in the sensor portion 4, and adhere to the movable electrodes 11, 12. The foreign material may short-circuit the movable electrodes 11, 12 and the fixed electrodes 21, 31 or disturb the displacement of the movable portion 10 under application of acceleration. Therefore, the capacitance type acceleration sensor does not normally function as a sensor.

Figure 3A:
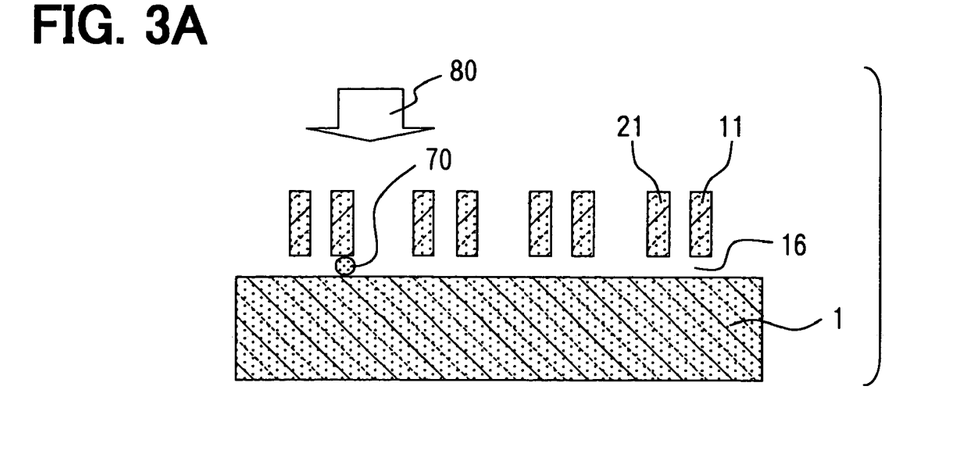
FIG. 3A is a diagram before the movable portion is displaced.

Therefore, visual examination is carried out from the surface of the sensor portion 4 by using a detection unit such as an optical microscope or the like. However, even when the visual examination is carried out from the surface of the sensor portion 4 by using a microscope using visible light or the like as the detecting unit 80, foreign material 70 itself existing in the hollow portion 16 beneath the movable portion 10 (the movable electrodes 11 in FIG. 3A) cannot be detected. FIG. 3A is a cross-sectional view taken along a line IIIA—IIIA of FIG. 1A, and shows a state before the movable portion 10 is displaced. For the sake of convenience, only the first detector 50 is shown in FIG. 3A.

When a microscope using infrared ray or the like is used as the detecting unit 80, infrared ray is transmitted through the movable portion 10 for examination to detect the foreign material 70 below the movable portion 10. However, even if the foreign material 70 is found, it is difficult to remove the foreign material 70 hidden below the movable portion 10, and thus such products have been hitherto treated as defectives.

Figure 3B:
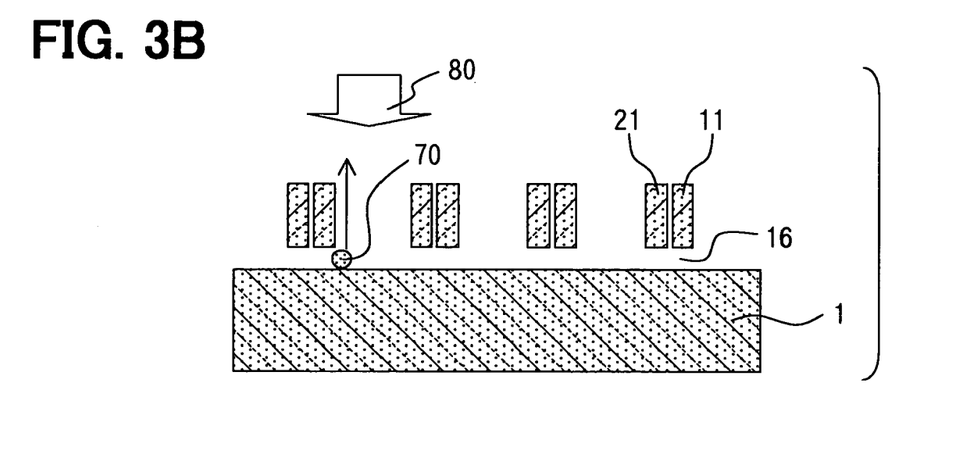
FIG. 3B is a diagram after the movable portion is displaced.

However, according to this embodiment, by applying a predetermined driving voltage to the movable portion 10 and the fixed portions 20, 30, electrostatic force is induced between each of the movable electrodes 11, 12 and each of the fixed electrodes 21, 31, so that the movable electrodes 11 are displaced by a predetermined amount as shown, for example, in FIG. 3B. Accordingly, the foreign material 70 which is hidden in the hollow portions 16 beneath the movable electrodes 11 before the displacement of the movable electrodes 11 is exposed to the outside, so that the foreign material 70 can be removed by, for example, suction as described later.

Figure 3C:
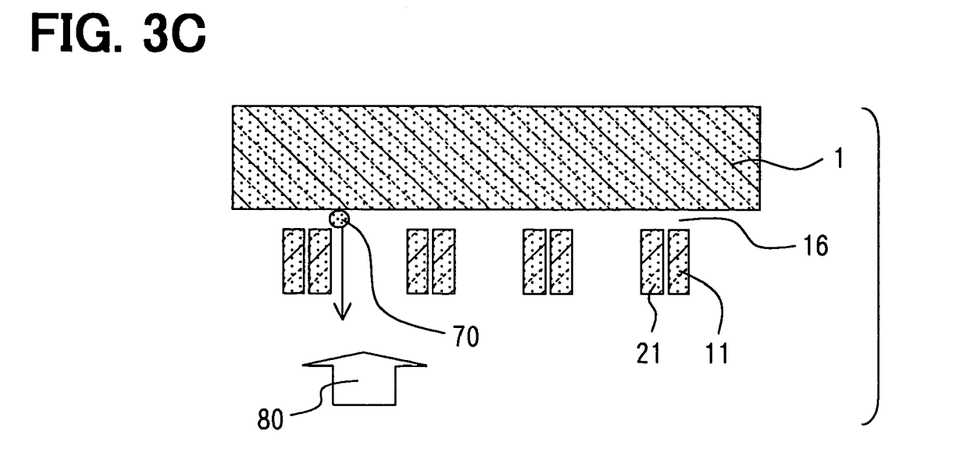
FIG. 3C is a diagram showing a vertically inverted arrangement of FIG. 3B after the movable portion is displaced.

As a specific foreign material removing method, the capacitance type acceleration sensor is disposed so that the movable electrodes 11 are located below the first semiconductor layer 1 as shown in FIG. 3C. A probe is brought into contact with the movable electrode pad 17 and the fixed electrode pads 23, 33 and a predetermined driving voltage is applied to displace the movable electrodes 11 (movable portion 10). Through the displacement of the movable electrodes 11, the foreign material 70 is exposed from the position beneath movable electrode 11 as shown in FIG. 3C, so that the foreign material 70 falls down to the outside of the sensor and is thus removed by its own weight.

The displacement amount of the movable electrodes 11 is not limited to a specific value. However, in this embodiment, the displacement amount is set to a length achieved by subtracting the height of the adherence preventing projecting portion (not shown) equipped to the detection face of each fixed electrode 21 from the distance between the detection faces of each movable electrode 11 and each fixed electrode 21 before the movable portion is displaced, and the predetermined driving voltage is applied so that the movable electrodes 11 are displaced by the length concerned.

As described above, according to the capacitance type acceleration sensor of this embodiment, the movable portion 10 is displaced by applying the driving voltage between the movable portion 10 and each fixed portion 20 (30), so that the foreign material 70 located in the hollow portion 16 beneath the movable portion 10 before the movable portion 10 is displaced can be exposed. Accordingly, the foreign material 70 can be removed, and thus more appropriate quality assurance can be executed. Furthermore, the yielding percentage of sensors can be increased.

The above foreign material removing method is substantially executed together with the visual examination based on the detecting unit 80. For example, an optical microscope using visible light is prepared, and visual examination is carried out before the movable portion is displaced. After the visual examination before the displacement is finished, a probe is brought into contact with the movable electrode pad 17 and the fixed electrode pads 23, 33 and a predetermined driving voltage is applied to these pads to displace the movable electrodes 11. Under this displacement state, visual examination is carried out by using the detecting unit 80, and it is checked whether any foreign material 70 exists at a site where it is hidden before the displacement. When some foreign material 70 is detected, the foreign material 70 thus exposed is removed. After the foreign material is removed, the visual examination is carried out again to check whether all the foreign material 70 is removed.

By detecting the presence or absence of the foreign material 70 with the detecting unit 80, the removal of the foreign material can be conducted on only a site at which the foreign material 70 exists, so that the removal of the foreign material can be efficiently performed.

Furthermore, the removal of foreign material 70 and the visual examination can be executed in the same step, so that an increase of the number of steps can be suppressed.

In the case of FIG. 3C, after the displacement of the movable electrodes 11, the foreign material 70 may fall down and be removed. Accordingly, in this case, it is assumed that no foreign material 70 exists at the site before the displacement or the driving voltage may be adjusted to stepwise displace the movable electrodes 11 so that the foreign material 70 is kept to be slightly exposed from the position beneath the movable electrode 11.

Figure 4:
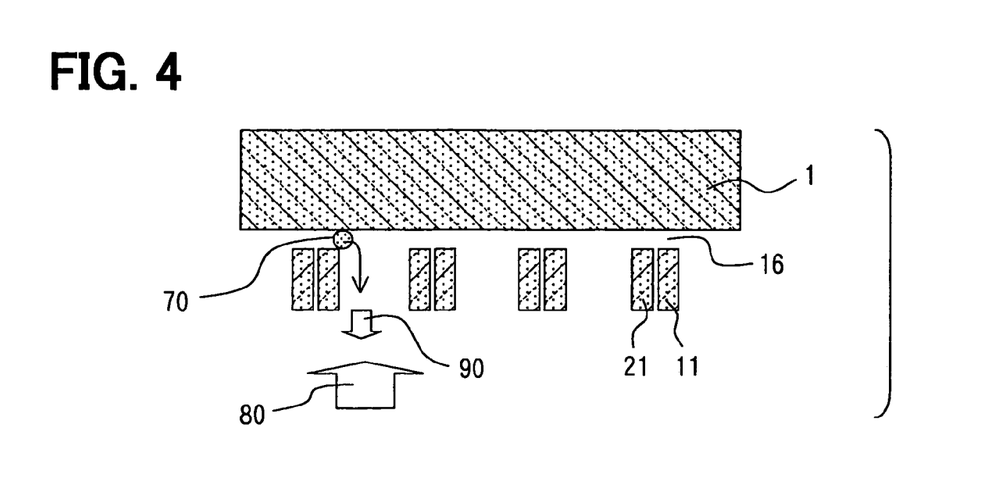
FIG. 4 is a cross-sectional view showing a modification of the foreign material removing method.

In this embodiment, the exposed foreign material 70 is made to fall down by its own weight as shown in FIG. 3C, whereby the foreign material 70 is removed. However, other foreign material removing methods may be used. For example, the foreign material 70 may be forcedly sucked and removed by a suction unit 90 under the state that the movable electrodes 11 are displaced as shown in FIG. 4. In this case, even when the foreign material 70 is not perfectly exposed from the movable electrode 11, it can be removed. Furthermore, the foreign material 70 can be removed even when the foreign material 70 is electrified and thus adheres to the back surface of the movable portion 10 (movable electrode 11) or the like although it is exposed, or even when the foreign material 70 is adhered in the gap between the movable electrode 11 and the first semiconductor layer 1. The removing operation using a suction unit 90 may also be applied to a case where the movable electrodes 11 are located above the first semiconductor layer 1 as shown in FIG. 3B. However, when the removing operation is carried out while the movable electrodes 11 are located below the first semiconductor layer 1 as shown in FIG. 4, the foreign material 70 can be more efficiently removed by its own weight.

As another foreign material removing method, a driving voltage can be applied in such a way that each movable electrode 11 is successively displaced toward each of both the fixed electrodes 21 which are disposed to sandwich the movable electrode 11 therebetween and confront the movable electrode 11, thereby shaking down and removing the foreign material 70. For example, by applying a predetermined driving voltage under the state that the movable electrodes 11 are located below the first semiconductor layer 1, the movable electrodes 11 are displaced to the fixed electrodes 21 at one side. Then, the driving voltage is turned off so that the movable electrodes 11 are displaced to the fixed electrodes 21 at the other side and returned to the position before the displacement. This operation is successively carried out, whereby the movable electrodes 11 are repetitively displaced to the right and left sides in FIG. 5 and the foreign material 70 beneath the movable electrode 11 before the displacement is shaken by the displacement of the movable electrode 11, so that the foreign material 70 is exposed from the movable electrode 11 and thus falls down to be removed. In this case, even when the foreign material 70 does not fall down by its own weight by merely displacing the movable electrodes 11 (for example, the foreign material 70 is not exposed or is only slightly exposed or the foreign material 70 is bitten in the gap between the movable electrode 11 and the first semiconductor layer 1), the foreign material 70 can be exposed by vibration based on continuous displacement of the movable electrodes 11, so that the foreign material 70 is made to fall down and removed.

Figure 5:
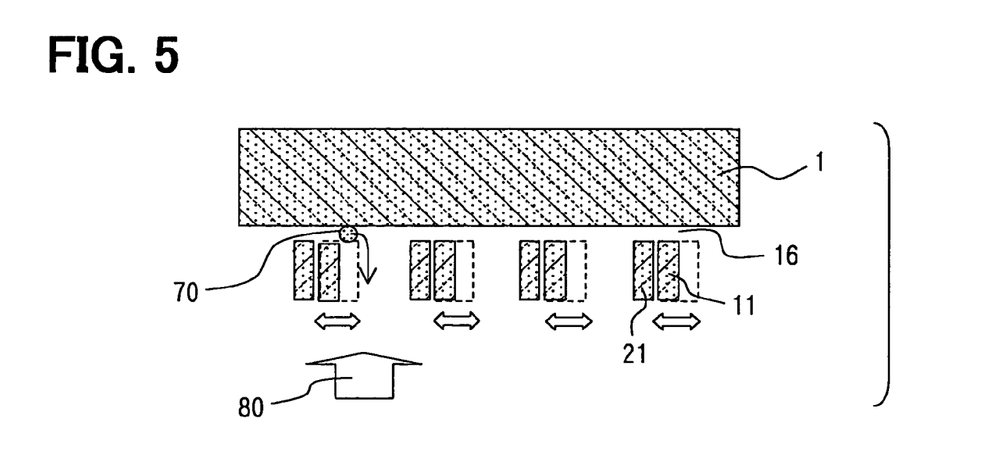
FIG. 5 is a cross-sectional view showing a modification of the foreign material removing method.
Figure 6:
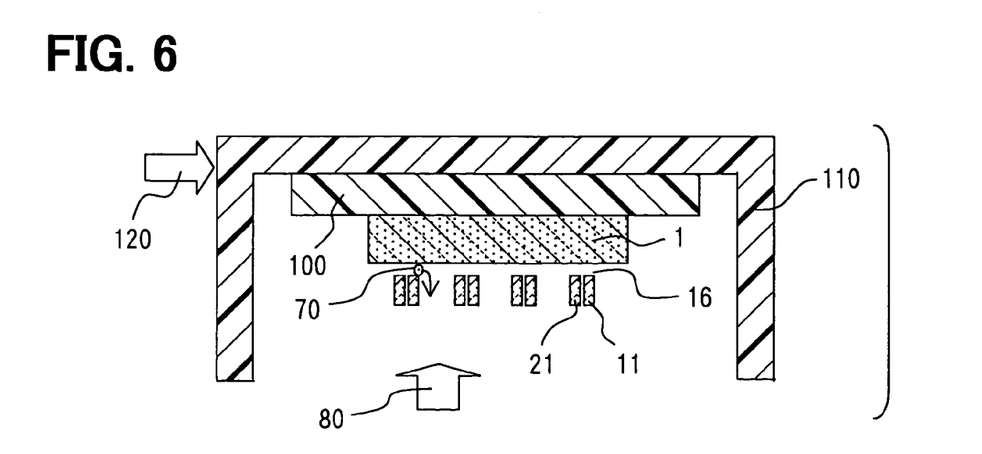
FIG. 6 is a cross-sectional view showing a modification of the foreign material removing method.

As another foreign material removing method, an external force 120 may be applied to a package 110 when the capacitance type acceleration sensor is mounted on a package 110 through a circuit board 100, whereby the foreign material 70 is made to fall down and thus be removed by the impact. For example, even when the foreign material 70 does not fall down and is not removed by merely displacing the movable electrodes 11 under the state that the movable electrodes 11 are located below the first semiconductor layer 1 (for example, the foreign material 70 is not perfectly exposed or the foreign material 70 is bitten in the gap between the movable electrode 11 and the first semiconductor layer 1), the foreign material 70 can be perfectly exposed, thus made to fall down by the impact and removed. The foreign material removing methods shown in FIGS. 4 to 6 are executed together with the visual examination based on the detecting unit 80.

In the description of the removing method of the foreign material 70 shown in FIGS. 3A to 3C, FIG. 4, FIG. 5 and FIG. 6, only the movable electrodes 11 are described while being illustrated. However, the same is applied to the other constituent elements of the movable portion 10 such as the movable electrodes 12, the poise portion 13 and the spring portions 14.

The foregoing description relates to the preferred embodiments of the present invention. However, the present invention is not limited to these embodiments, and various modifications may be made.

In the above embodiments, the capacitance type acceleration sensor is used as the capacitance type dynamic quantity sensor; however, the present invention may be applied to a capacitance type sensor such as a yaw rate sensor, an angular velocity sensor or the like.

As the detecting unit 80 may be used a detecting unit 80 using a light source for emitting light transmissible through the movable portion 10, such as infrared ray or the other light than the visible light. In this case, before the displacement of the movable portion 10, the foreign material 70 is checked by the detecting unit 80, and when the foreign material 70 is detected, a predetermined driving voltage is applied to the movable portion 10 and the fixed portions 20, 30 to displace the movable portion 10. Under the state that the exposed foreign material 70 is removed and the driving voltage is turned off to return the movable portion 10 to the original position, it is checked by the detecting unit 80 again whether the foreign material 70 is removed or not. However, the detecting unit 80 using infrared ray or the like is generally lower in detection capability than the detecting unit 80 using visible light. Therefore, it is preferable to check the detection of the foreign material 70 and the removal of the foreign material 70 by the detecting unit 80 using visible light.

Furthermore, in this embodiment, as an example of the capacitance type acceleration sensor has been described the structure that the hollow portion 16 is formed between the movable portion 10 and the first semiconductor layer 1 by etching the second semiconductor layer 2 and the insulating layer 3. However, the present invention may be applied to the structure having the hollow portion 16 between the movable portion 10 and the insulating layer 3 by etching only the second semiconductor layer 2. That is, if a capacitance type dynamic quantity sensor has a structure having a semiconductor substrate through a hollow portion 16 at the back surface side of a movable portion 10, the present invention is applicable to the capacitance type dynamic quantity sensor described above.

What is claimed is:

1. A method for removing foreign material from a capacitance type dynamic quantity sensor comprised of a movable portion having a poise portion mounted on a semiconductor substrate through a spring portion to be displaced in accordance with application of a dynamic quantity to thereby detect the dynamic quantity, movable electrodes integrally formed with the poise portion so as to extend from the side surface of the poise portion, and a fixed portion having fixed portion anchors mounted on the semiconductor substrate and fixed electrodes, wherein each of the fixed electrodes has a detection face confronting to a detection face of each of the movable electrodes and extends from each of the fixed portion anchors, the dynamic quantity being detected on the basis of variation of electrostatic capacitance between each movable electrode and each fixed electrode when under the application of the dynamic quantity, the movable portion is displaced in a direction along which the distance between the detection faces of the movable electrode and the fixed electrode varies, the method comprising:

applying a predetermined driving voltage between the movable portion and the fixed portion to displace the movable portion and thereby expose the foreign material in a hollow portion below the movable portion to the outside and removing the foreign material.

2. A method for removing foreign material from a capacitance type dynamic quantity sensor comprised of a movable portion having a poise portion mounted on a semiconductor substrate through a spring portion to be displaced in accordance with application of a dynamic quantity to thereby detect the dynamic quantity, movable electrodes integrally formed with the poise portion so as to extend from the side surface of the poise portion, and a fixed portion having fixed portion anchors mounted on the semiconductor substrate and fixed electrodes, wherein each of the fixed electrodes has a detection face confronting to a detection face of each of the movable electrodes and extends from each of the fixed portion anchors, the dynamic quantity being detected on the basis of variation of electrostatic capacitance between each movable electrode and each fixed electrode when under the application of the dynamic quantity, the movable portion is displaced in a direction along which the distance between the detection faces of the movable electrode and the fixed electrode varies, the method comprising:

applying a predetermined driving voltage between the movable portion and the fixed portion to displace the movable portion and thereby expose the foreign material in a hollow portion below the movable portion to the outside and be removed, wherein the foreign material is removed under suction while the movable portion is displaced.

3. The method according to claim 2, wherein the foreign material is removed under suction while the movable portion is displaced under a state that the capacitance type dynamic quantity sensor is disposed so that the movable portion is located below the semiconductor substrate.

4. A method for removing foreign material from a capacitance type dynamic quantity sensor comprised of a movable portion having a poise portion mounted on a semiconductor substrate through a spring portion to be displaced in accordance with application of a dynamic quantity to thereby detect the dynamic quantity, movable electrodes integrally formed with the poise portion so as to extend from the side surface of the poise portion, and a fixed portion having fixed portion anchors mounted on the semiconductor substrate and fixed electrodes, wherein each of the fixed electrodes has a detection face confronting to a detection face of each of the movable electrodes and extends from each of the fixed portion anchors, the dynamic quantity being detected on the basis of variation of electrostatic capacitance between each movable electrode and each fixed electrode when under the application of the dynamic quantity, the movable portion is displaced in a direction along which the distance between the detection faces of the movable electrode and the fixed electrode varies, the method comprising:

applying a predetermined driving voltage between the movable portion and the fixed portion to displace the movable portion and thereby expose the foreign material in a hollow portion below the movable portion to the outside and be removed, wherein the capacitance type dynamic quantity sensor is disposed so that the movable portion is located below the semiconductor substrate, and the movable portion is displaced under this state so that the foreign material exposed is made to fall down, thereby removing the foreign material.

5. The method according to claim 4, wherein the capacitance type dynamic quantity sensor is mounted in a package, and the foreign material is made to fall down and removed by applying external force to the package under a state that the movable portion is displaced.

6. The method according to claim 4, wherein the driving voltage is applied in such a way that the movable electrode is successively displaced toward each of both the fixed electrodes which are disposed to sandwich the movable electrode therebetween and confront the movable electrode, thereby displacing the movable portion, so that the foreign material is made to fall down and removed.

7. The method according to claim 6, wherein the foreign material in the hollow portion under the movable portion is detected by a detector, and the foreign material is removed on the basis of a detection result.

8. The method according to claim 7, wherein the detector checks whether the detected foreign material has been removed.

9. The method according to claim 8, wherein the detector uses visible light, and performs detection under a state that the movable portion is displaced.

10. A method for removing foreign material from a capacitance type dynamic quantity sensor comprised of a movable portion having a poise portion mounted on a semiconductor substrate through a spring portion to be displaced in accordance with application of a dynamic quantity to thereby detect the dynamic quantity, movable electrodes integrally formed with the poise portion so as to extend from the side surface of the poise portion, and a fixed portion having fixed portion anchors mounted on the semiconductor substrate and fixed electrodes, wherein each of the fixed electrodes has a detection face confronting to a detection face of each of the movable electrodes and extends from each of the fixed portion anchors, the dynamic quantity being detected on the basis of variation of electrostatic capacitance between each movable electrode and each fixed electrode when under the application of the dynamic quantity, the movable portion is displaced in a direction along which the distance between the detection faces of the movable electrode and the fixed electrode varies, the method comprising:

applying a predetermined driving voltage between the movable portion and the fixed portion to displace the movable portion and thereby expose the foreign material in a hollow portion below the movable portion to the outside and be removed, wherein the foreign material in the hollow portion under the movable portion is detected by a detector, and the foreign material is removed on the basis of a detection result.

11. The method according to claim 10, wherein the detector checks whether the detected foreign material has been removed.

12. The method according to claim 11, wherein the detector uses visible light, and performs detection under a state that the movable portion is displaced.

13. The method according to claim 10, wherein the detector uses visible light, and performs detection under a state that the movable portion is displaced.

* * * * *